(12) United States Patent
Schellmann et al.

(10) Patent No.: US 10,660,093 B2
(45) Date of Patent: May 19, 2020

(54) BASE STATION AND METHOD FOR CONTROLLING RADIO RESOURCES ALLOCATION

(71) Applicant: Huawei Technologies Co., Ltd., Shenzhen, Guangdong (CN)

(72) Inventors: Malte Schellmann, Munich (DE); Egon Schulz, Munich (DE); Christoph Thein, Hannover (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 292 days.

(21) Appl. No.: 14/822,098

(22) Filed: Aug. 10, 2015

(65) Prior Publication Data

US 2015/0351098 A1 Dec. 3, 2015

Related U.S. Application Data

(63) Continuation of application No. PCT/EP2013/052602, filed on Feb. 8, 2013.

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0007* (2013.01); *H04L 5/0037* (2013.01);
(Continued)

(58) Field of Classification Search
CPC .............. H04W 72/0453; H04W 88/08; H04L 27/0006; H04L 5/0007; H04L 5/0037; H04L 27/264; H04L 5/0064
See application file for complete search history.

(56) References Cited

U.S. PATENT DOCUMENTS 9,628,231 B2 *  4/2017  Shattil .................. H04L 5/0035
2007/0133701 A1  6/2007  Iwami
(Continued)

FOREIGN PATENT DOCUMENTS

CN    101405973 A       4/2009
CN    102340824 A  *    2/2012
(Continued)

OTHER PUBLICATIONS

Davidson et al, Design of Orthogonal Pulse Shapes for Communications via Semidefinite Programming, IEEE. May 5, 2000, 13 pages.*
(Continued)

*Primary Examiner* — Mounir Moutaouakil
(74) *Attorney, Agent, or Firm* — Huawei Technologies Co., Ltd.

(57) ABSTRACT

The invention relates to a base station, comprising: a transceiver for multi-carrier radio transmission within a radio frequency band, the transceiver being adapted to receive service quality requests of a plurality of users requesting service from the base station; and a radio resource controller being adapted to allocate subcarriers of the multi-carrier radio transmission to the users and configure the subcarriers in the radio frequency band according to the service quality requests of the users.

16 Claims, 6 Drawing Sheets

(51) Int. Cl.
  *H04L 27/26* (2006.01)
  *H04L 27/00* (2006.01)
  *H04W 88/08* (2009.01)

(52) U.S. Cl.
  CPC ........ *H04L 5/0064* (2013.01); *H04L 27/0006* (2013.01); *H04L 27/264* (2013.01); *H04W 88/08* (2013.01)

(56) References Cited

U.S. PATENT DOCUMENTS

| | | | | |
|---|---|---|---|---|
| 2007/0171808 | A1* | 7/2007 | Wu | H04B 7/0452 370/208 |
| 2007/0223440 | A1 | 9/2007 | Ho et al. | |
| 2009/0122771 | A1* | 5/2009 | Cai | H04J 11/00 370/338 |
| 2009/0141678 | A1* | 6/2009 | Sun | H04L 1/1819 370/329 |
| 2009/0257344 | A1* | 10/2009 | Huang | H04L 27/2697 370/210 |
| 2009/0306976 | A1* | 12/2009 | Joetten | H04L 5/1415 704/214 |
| 2010/0184445 | A1* | 7/2010 | Tseng | H04W 72/1284 455/450 |
| 2011/0081875 | A1* | 4/2011 | Imamura | H04B 1/04 455/101 |
| 2011/0092219 | A1* | 4/2011 | Damnjanovic | H04W 52/281 455/450 |
| 2011/0188550 | A1* | 8/2011 | Wajcer | H04L 25/068 375/214 |
| 2011/0211655 | A1* | 9/2011 | Wang | H04L 5/0023 375/295 |
| 2012/0263121 | A1* | 10/2012 | Chen | H04L 1/1607 370/329 |
| 2013/0031210 | A1* | 1/2013 | Redmond | H04L 12/185 709/218 |
| 2013/0195002 | A1* | 8/2013 | Walker | H04W 4/00 370/312 |
| 2013/0215823 | A1* | 8/2013 | Shin | H04L 5/001 370/328 |
| 2014/0198865 | A1* | 7/2014 | Pietsch | H04L 5/0048 375/260 |
| 2015/0117292 | A1* | 4/2015 | Cho | H04W 76/14 370/312 |
| 2015/0201418 | A1* | 7/2015 | Zhang | H04W 76/38 370/329 |
| 2016/0119915 | A1* | 4/2016 | Simonsson | H04L 5/0048 370/329 |
| 2019/0182701 | A1* | 6/2019 | Yi | H04L 12/1435 |

FOREIGN PATENT DOCUMENTS

| | | |
|---|---|---|
| GB | 2 415 871 A | 1/2006 |
| JP | 2003037639 A * | 2/2003 |
| WO | 2012025131 A1 | 3/2012 |

OTHER PUBLICATIONS

"Adaptive Modulation and Coding (AMC)", Motorola, Oct. 20-24, 2000, 7 pages.

Pierre Siohan, et al., "Analysis and Design of OFDM/OQAM Systems Based on Filterbank Theory", IEEE Transactions on Signal Processing, vol. 50, No. 5, May 2002, p. 1170-1183.

Frank Schaich, "Filterbank Based Multi Carrier Transmission (FBMC)—evolving OFDM, FBMC in the context of WiMAX", 2010 European Wireless Conference, p. 1051-1058.

Deepak Dasalukunte, et al., "Multicarrier Faster-Than-Nyquist Transceivers: Hardware Architecture and Performance Analysis", IEEE Transactions on Circuits and Systems-I: Regular Papers, vol. 58, No. 4, Apr. 1, 2011, p. 827-838.

Qing Bai, et al., "Scheduling and Resource Allocation in OFDM and FBMC Systems: An Interactive Approach and Performance Comparison", 2010 European Wireless Conference, Apr. 12, 2010, p. 1042-1050.

Mazo, Faster-than-nyquist signaling. American telephone and telegraph company, the bell system technical journal vol. 54 No. 8, Oct. 1975. total 12 pages.

* cited by examiner

BASE STATION AND METHOD FOR CONTROLLING RADIO RESOURCES ALLOCATION

CROSS-REFERENCE TO RELATED APPLICATIONS

This application is a continuation of International Application No. PCT/EP2013/052602, filed on Feb. 8, 2013, which is hereby incorporated by reference in its entirety.

BACKGROUND

The present invention relates to a base station and a method for controlling radio resources allocation in a base station. In particular, the invention relates to the fields of radio access in cellular communications systems, radio resource allocation and adaptive radio transmission.

In recent years, rapid advances in integrate-circuits and digital signal processors in the growth of Moore's law have given radio systems much more powerful baseband processing capabilities than ever before, which allows state-of-the-art wideband cellular systems to be dynamically adjusted in the use of its radio symbols or even the waveform.

Filter-bank based multi-carrier (FBMC) transmission as described by P. Siohan, C. Siclet and N. Lacaille: "Analysis and design of OFDM/OQAM systems based on filterbank theory," in *IEEE Transactions on Signal Processing*, vol. 50, no. 5, pp. 1170-1183, May 2002 and by F. Schaich: "Filter-bank based multi carrier transmission (FBMC)—evolving OFDM: FBMC in the context of WiMAX" in 2010 *European Wireless Conference (EW)*, 2010, pp. 1051-1058 is a multi-carrier transmission scheme that allows the cellular system to use arbitrary adjustable pulse shapes for transmission. Pulse shapes may be adapted to requirements from the regulatory spectral mask, the mobility conditions with respect to the robustness against high Doppler Effect and the desired degree of robustness, e.g. synchronization errors. A spectrally efficient FBMC system can be realized based on OQAM-OFDM signaling.

By selecting suitable pulse shapes, FBMC systems generate very low out-of-band leakage. Thereby, the guard-band between two non-orthogonal systems operating next to each other in the frequency band is significantly reduced. In contrast, only incremental advances were observed in the radio frequency frontends of cellular system in recent years in terms of improving the instruments' linearity and dynamic range. Consequently, the modulation order for radio symbols is practically limited due to implementation and cost factors.

In this context, one transmission mode called "Faster Than Nyquist" (FTN) as described by D. Dasalukunte, F. Rusek, and V. Owall: "Multicarrier Faster-Than-Nyquist Transceivers: Hardware Architecture and Performance Analysis," in *IEEE Transactions on Circuits and Systems I: Regular Papers*, vol. 58, no. 4, pp. 827-838, April 2011 has been proposed by academia to achieve higher data rate for the transmission with limited modulation orders, so as to substantially improve the radio efficiency when channel conditions are extremely good, i.e., at high signal-to-noise ratio.

With allowing configuring the waveform, specifically the pulse shapes when using the FBMC technology, as well as the transmission modes, specifically the FTN, two new degrees of freedom are gained when allocating the radio resources in cellular systems. For today's radio systems, adaptive modulation and coding (AMC) schemes are used to adapt the transmission signaling to the specific link conditions. These allow an adaptation of the signaling per link in two dimensions: the modulation constellation and the code rate. Additionally, transmit power allocation schemes have been proposed and are in use today. For future systems, a significantly increased variation of service demands and a large variety of user terminal types are foreseen. Along with the diverse channel selective characteristics, i.e., channel conditions observed on each radio link, the problem space spanned for the radio resource allocation problem is considered to be significantly increased in its dimensions.

If common radio resource allocation strategies like AMC are applied for systems based on a fixed signaling scheme like OFDM, the following drawbacks are encountered. First, the system fails to take advantage of extremely good channel conditions and only leads to moderate data rate transmission. Further, the system neglects to take a group of high mobility users into account. Due to the high Doppler Effect, the traditional OFDM systems suffer from high frequency offset that distorts the performance severely. OFDM based systems have strong requirements on frequency and time domain synchronization. Poorly synchronized systems, e.g., low-power low-cost sensor devices suffer from severe performance degradation. The system has to fulfill strict out-of-band leakage requirement by the regulator when accessing some specific spectrum bands that are shared with other systems. The edge-band usage of conventional OFDM signal causes a substantial waste of large guard-bands, in particular if only a narrow spectrum band is available.

The prior art of transmission scheme that is frequently applied on nowadays LTE and WiMax systems is called "Adaptive Modulation and Coding" (AMC) according to TSGR1#17 (00)1395, "Adaptive Modulation and Coding (AMC)," Stockholm, Sweden, 2000. It is usually combined with OFDM or spread coding, i.e., CDMA schemes to adaptively select a suitable set of transmission parameters, namely modulation and coding scheme (MCS), i.e. modulation/constellation order and coding rate. For the application on LTE systems, by dynamically receiving the feedback of Channel Quality Indication, together with the QoS requirements from higher layers, i.e. data rate, packet loss rate, etc., the LTE MAC scheduler decides the most suitable MCS either user-wise or physical-resource-block wise. The parameters of prior art systems, such as the length of the cyclic prefix and the subcarrier spacing are only long-term system-specific parameters that cannot be dynamically adjusted.

SUMMARY

It is the object of the invention to provide an improved technique of radio resources allocation.

This object is achieved by the features of the independent claims. Further implementation forms are apparent from the dependent claims, the description and the figures.

The invention is based on the finding that an adaptive transmission scheme with new degrees of freedoms in the context of dynamic radio resource allocation provides improved efficiency in radio resources allocation. Additional dimensions of the problem space together with the specific requirements of the new services are appropriately applied for improving the radio resource allocation process. When using the FBMC system structure, for example, such additional dimensions are the signal waveform, transmission modes and the subcarrier spacing, for example, that are individually configured for each radio link. The transmission scheme adaptively configures the waveform and transmission mode per link/user, i.e., per device, or per user group, thereby enabling to achieve significant system performance gains in terms of system radio spectrum efficiency.

In order to describe the invention in detail, the following terms, abbreviations and notations will be used:

CP: Cyclic Prefix
   The CP refers to the prefixing of a symbol with a repetition of the end. Although the receiver is typically configured to discard the CP samples, the CP serves two purposes: As a guard interval, it eliminates the intersymbol interference from the previous symbol. As a repetition of the end of the symbol, it allows the linear convolution of a frequency-selective multipath channel to be modeled as circular convolution, which in turn may be transformed to the frequency domain using a discrete Fourier transform.

CP-OFDM: CP based OFDM
   CP-OFDM transmits complex valued symbols on each sub-carrier. In CP-OFDM, the transmitted signal can be written as a function of the symbol conveyed by the sub-carrier of index m during the symbol time of index n and a synthesis filter basis which is obtained by time-frequency translation of a prototype filter function, where the time-frequency translation depends on the symbol duration and the inter-carrier frequency spacing.

EGF: Extended Gaussian Function
   The EGF is derived from the Gaussian function as described by M. Alard, C. Roche, and P. Siohan in "A new family of function with a nearly optimal time-frequency localization", Technical Report of the RNRT Project Modyr, 1999 and by P. Siohan and C. Roche in "Cosine-Modulated Filterbanks Based on Extended Gaussian Function", IEEE Transactions on Signal Processing, vol. 48, no. 11, pp. 3052-3061, November 2000.

FBMC: Filter Bank based Multi Carrier
   The FBMC system comprises a synthesis filter bank (SFB) at transmitter side and an analysis filter bank (AFB) at receiver side. The SFB combines M low rate subcarrier signals into one high rate signal which is transmitted over a frequency selective radio channel. The AFB splits the received high rate signal into M low rate subcarrier signals again. One FIR equalizer per subcarrier is usually employed to compensate for the intersymbol interference (ISI) and inter-channel interference (ICI) caused by the frequency selective radio channel and to improve the symbol decisions.

FTN: Faster-Than-Nyquist
   In 1975, J. E. Mazo described in "Faster-than-Nyquist Signaling," Bell Syst. Tech. J., vol. 54, pp. 1451-1462, October 1975 that binary sin c(t/T) pulses could be sent every $T_A$ seconds, $T_A<T$, without loss in asymptotic error probability. This he called FTN signaling, because the pulses appear faster than allowed by Nyquist's limit for orthogonal pulses. FTN signaling has since been generalized in a number of ways.

IOTA: IOTA function
   The IOTA function is a special case of EGF and its properties such as orthogonality and good time frequency localization are shared with these EGF functions.

Link: a point-to-point connection between two users

LTE: Long Term Evolution
   LTE, marketed as 4G LTE, is a standard for wireless communication of high-speed data for mobile phones and data terminals. It is based on the GSM/EDGE and UMTS/HSPA network technologies, increasing the capacity and speed using a different radio interface together with core network improvements OFDM: Orthogonal Frequency Division Multiplexing
   OFDM is a frequency-division multiplexing (FDM) scheme used as a digital multi-carrier modulation method. A large number of closely spaced orthogonal sub-carrier signals are used to carry data on several parallel data streams or channels. Each sub-carrier is modulated with a certain modulation scheme (such as quadrature amplitude modulation or phase-shift keying, etc.) at a lower symbol rate, maintaining total data rates similar to conventional single-carrier modulation schemes in the same bandwidth.

OQAM: Offset Quadrature Amplitude Modulation
   The principle of single-carrier OQAM is to delay the quadrature signal by T/2 with respect to the in-phase signal before modulation at the transmitter, where T is the symbol period. In the single-channel case, the use of OQAM eliminates the amplitude fluctuations associated with n phase shift.

OFDM: OQAM—Orthogonal Frequency Division Multiplexing
   QAM-OFDM transmits real valued symbols modulated by OQAM on each sub-carrier instead of using complex baseband symbols as in OFDM/QAM scheme. The synthesis basis functions are obtained by a time-frequency translated version of the prototype filter function, thereby maintaining orthogonality among the synthesis and analysis basis.

PDCCH: Physical Downlink Control Channel
   The PDCCH is a downlink channel of the e-UTRAN protocol stack, i.e. the air interface of 3GPP's LTE upgrade path for mobile networks. PDCCH carries between others the downlink allocation information and uplink allocation grants for the terminal.

QoS: Quality of Service
   QoS refers to the ability of a network to provide higher priority services, including dedicated bandwidth, controlled jitter and latency (required by some real-time and interactive traffic), and improved loss characteristics, to selected network traffic over various WAN, LAN and MAN technologies. At the same time, QoS guarantees that providing priority for one class of traffic does not make other flows fail.
   QoS is affected by various factors, which can be divided into "human" and "technical" factors. Human factors include: stability of service, availability of service and guaranteed delays. Technical factors include: reliability, scalability, effectiveness, maintainability, grade of service, etc. As packets travel from origin to destination, the following problems can result in a degradation of service quality: Low throughput due to varying load from other users sharing the same network resources, dropped packets as the routers might fail to deliver, i.e. drop some packets, transmission errors caused by noise and interference, Latency because of long queues or congestion in the network, Jitter due to variation of packet delivery, Out-of-order delivery due to different routes of packets through the network.

SNR: Signal-to-Noise Ratio
   SNR is the ratio of the power strength of usable signal being transmitted to the strength of undesired signal (noise). It is a measure of radio link transmission quality.

According to a first aspect, the invention relates to a base station, comprising: a transceiver for multi-carrier radio transmission within a radio frequency band, the transceiver being adapted to receive service quality requests of a plurality of users requesting service from the base station; and a radio resource controller adapted to allocate subcarriers of the multi-carrier radio transmission to the users and to configure the subcarriers in the radio frequency band according to the service quality requests of the users.

When the radio resource controller allocates and configures the subcarriers in the radio frequency band according to the service quality requests of the users, the throughput, QoS and complexity of the transmission scheme can be adapted individually per user to the corresponding environmental and system conditions. Some users may request a higher service quality because they are connected by a long and/or noisy transmission channel to the base station or because they are configured for real-time data transmission. Other users may request a lower service quality because they are connected by a short and/or undistorted transmission channel to the base station or because they are configured for non-real-time data transmission or because they want to use a cheaper rate. By adapting the radio resource controller to these specific service quality requests of the users, the base station can provide efficient service to each user according to his individual needs. As the waveform with which the user is provided is individually configurable for each user according to a user's specific service request, throughput, quality, complexity and reliability of the overall system can be improved. Allocation of the subcarriers in the radio frequency band includes arranging the subcarriers at appropriate positions in the radio frequency band. Configuration of the subcarriers in the radio frequency band includes forming the subcarriers with respect to appropriate spectral shapes. The appropriate positions and the appropriate shapes can be determined by using some optimization criteria. Therefore, in comparison to other schemes, a higher degree of adaptation is possible as a large set of individual requirements can be considered for each user, which results in a better coexistence ability of the whole system due to the utilization of the appropriate waveforms where needed, a better service for every user due to spectral more efficient transmissions, an increase in the system capacity due to spectral more efficient transmissions, a more scalable QoS distribution for every user controllable by the operator and depending on the status of the user and finally a more economical usage of the resource spectrum and energy.

The radio resource controller is able to arrange or configure the subcarriers in the radio frequency band according to the service quality requests of the users. Thus, the placing of the subcarriers in the radio frequency band is not predetermined, the arrangement and the configuration of the subcarriers in the radio frequency band can be flexibly and dynamically determined according to the requirements of the users. In particular, the allocation of the subcarriers in the radio frequency band includes arranging the subcarriers at appropriate positions in the radio frequency band with respect to some optimality criterion and the configuration of the subcarriers in the radio frequency band includes forming the subcarriers regarding appropriate spectral shapes with respect to some optimality criterion. The optimality criteria take into account the service quality requests of the users and thereby consider the specific needs of the clients.

In a first possible implementation form of the base station according to the first aspect, the radio resource controller is adapted to reconfigure the subcarriers in the radio frequency band responsive to a service quality request of a user requesting a different service quality.

A required service quality of a user can change, for example if the user wants to upgrade to a higher rate providing a higher QoS or when the user is moving from a center of a radio cell to an edge of the radio cell. Due to these changing conditions, the user may request a different service quality.

The configuration of the subcarriers in the frequency band can be dynamically changed according to the needs of the users. When a user is requesting a different service quality than before, for example, due to a movement to a cell edge, the subcarrier configuration or arrangement in the frequency band can be reconfigured assuring a better QoS to the user or maintaining the required QoS. Reconfiguration of the subcarriers in the radio frequency band means that the subcarriers will have a different position in the radio frequency band or that they will use a different pulse shape. Reconfiguration can be performed by using some optimality criterion based on the service quality requests of the users. The optimality criterion considers the variability in the service quality requests, i.e. the different service quality requests may result in a different configuration of the subcarriers in the radio frequency band, that is, different pulse shapes and/or different positions.

In a second possible implementation form of the base station according to the first aspect as such or according to the first implementation form of the first aspect, the configuring the subcarriers comprises at least one of the following: pulse forming the subcarriers, spacing the subcarriers in the frequency band, selecting a CP, selecting a guard band between two subcarriers allocated to neighboring users, selecting a guard band width between two subcarriers allocated to neighboring users, selecting a transmission mode for each user.

That allows a flexible and dynamic configuration of the subcarriers in the frequency band to fulfill the service requirements of the users.

In a third possible implementation form of the base station according to the first aspect as such or according to any of the preceding implementation forms of the first aspect, the radio resource controller is adapted to configure the subcarriers according to at least one of the following: an OQAM-OFDM transmission scheme, a CP-OFDM transmission scheme, a Zero Padding OFDM transmission scheme, an FTN transmission scheme, a priority of the users.

The base station is able to select among different transmission schemes for providing an optimum service quality to the users. This allows a flexible transmission dynamically adapted to changing environments.

In a fourth possible implementation form of the base station according to the first aspect as such or according to any of the preceding implementation forms of the first aspect, users requesting a same service quality are grouped in a same user group.

As network conditions are subject to changing environmental conditions, the following problems can result in a degradation of service quality: low throughput due to varying load from other users sharing the same network resources; dropped packets as the routers might fail to deliver, i.e. drop some packets; errors caused by noise and interference; latency because of long queues or congestion in the network; jitter due to variation of packet delivery; out-of-order delivery due to different routes of packets in the network. Neighboring users or users that are located in a same network node or users that require the same network services may face similar degradations in QoS. These users may be grouped in a same user group being provided with the same service quality. Service quality may be defined by different QoS classes, for example: background for data transfer of low errors and uncritical bandwidth, delay and jitter requirements; interactive for usage of interactive services with data transfer of low errors but higher requirements with respect to delay; streaming for streaming services where a minimum bandwidth is required and jitter is tolerable due to jitter buffer in the receiver; and conversational for telephony and video conferencing with similar requirements as streaming but less tolerable delay and jitter.

Users grouped in the same user group may be assigned to links of equal or similar properties, e.g. links of equal or similar transmission quality or performance. Transmission links may be configured for connecting user groups requiring the same service quality, e.g. one transmission link may be configured for serving user groups requiring background QoS, another transmission link may be configured for serving user groups requiring interactive QoS, another transmission link may be configured for serving user groups requiring streaming QoS, and another transmission link may be configured for serving user groups requiring conversational QoS. Such a grouping scheme facilitates configuration of the subcarriers in the frequency band and improves QoS.

In a fifth possible implementation form of the base station according to the first aspect as such or according to any of the preceding implementation forms of the first aspect, the transceiver is adapted for at least one of an FBMC radio transmission and an FTN transmission.

The FBMC radio transmission is an efficient scheme for transmitting a plurality of low rate subcarrier signals as one high rate signal over a frequency selective radio channel. The base station comprising the transceiver which is adapted for the FBMC transmission can be flexibly configured and dynamically adjusted to compensate for the ISI and ICI in order to improve the symbol decisions.

In a sixth possible implementation form of the base station according to the first aspect as such or according to any of the preceding implementation forms of the first aspect, the service quality request of a user comprises information on at least one of the following: an SNR of the user, a mobility of the user, a synchronization capability of the user, a battery status of the user, a bandwidth requirement of the user.

The base station may use all that information in order to provide an optimal configuration with respect to some or all of the users.

In a seventh possible implementation form of the base station according to the first aspect as such or according to any of the preceding implementation forms of the first aspect, the radio resource controller is adapted to configure a subcarrier according to an FTN mode when the subcarrier is allocated to a user whose transceiver supports FTN mode.

Thus, users are allocated to user-specific subcarriers in order to provide flexible and efficient radio resource usage. Users whose transceivers support FTN mode achieve higher data rate for the transmission with limited modulation orders, so as to substantially improve the radio efficiency when channel conditions are good, i.e., at high SNR.

In an eighth possible implementation form of the base station according to the first aspect as such or according to any of the preceding implementation forms of the first aspect, the radio resource controller is adapted to configure a subcarrier according to an FBMC mode when the subcarrier is allocated to a user whose transceiver supports FBMC mode.

Each user can be individually configured by the radio resource controller. Users whose transceivers support FBMC mode may be mapped to subcarriers of adjustable pulse shapes for transmission. The radio resource controller may adapt the pulse shapes to requirements from the regulatory spectral mask, the mobility conditions, e.g., with respect to robustness against Doppler effect and the desired degree of robustness, e.g., synchronization errors.

In a ninth possible implementation form of the base station according to the first aspect as such or according to any of the preceding implementation forms of the first aspect, the radio resource controller is adapted to configure a subcarrier according to a CP-OFDM mode when the subcarrier is allocated to a user whose transceiver neither supports FBMC mode nor FTN mode.

Users not supporting high data rate transmission modes may be mapped to subcarriers of a default configuration. Thus, the mobile station is flexible to adapt to users supporting different transmission modes, thereby providing service to each user.

In a tenth possible implementation form of the base station according to the first aspect as such or according to any of the preceding implementation forms of the first aspect, the radio resource controller is adapted to configure a subcarrier according to a CP-OFDM mode when the subcarrier is allocated to a user underlying an energy constraint.

The base station thus provides prioritized service to users requiring different QoS and priorities.

In an eleventh possible implementation form of the base station according to the first aspect as such or according to any of the preceding implementation forms of the first aspect, the radio resource controller is adapted to configure a subcarrier according to an FBMC mode when the subcarrier is allocated to a user whose moving speed is higher than a predetermined threshold or whose synchronization capabilities are below a predetermined level and whose transceiver supports FBMC mode.

The radio resource controller may adapt the pulse shapes for users whose transceivers support FBMC mode. The guard band between two non-orthogonal systems operated next to each other in the frequency band may be significantly reduced thereby, saving frequency resources and generating very low out-of-band leakage.

In a twelfth possible implementation form of the base station according to the first aspect as such or according to any of the preceding implementation forms of the first aspect, the configuring the subcarriers in the radio frequency band is based on a user-specific priority assigned to each user.

According to a second aspect, the invention relates to a method for controlling radio resources allocation in base station with a transceiver for multi-carrier radio transmission within a radio frequency band, the method comprising: receiving service quality requests of a plurality of users requesting service from the base station; allocating subcarriers of the multi-carrier radio transmission to the users; and configuring the subcarriers in the radio frequency band according to the service quality requests of the users.

The method provides a flexible and dynamic configuration of subcarriers. The overall throughput, the QoS and the complexity of the transmission scheme of every user can be adapted to the environmental and system condition by the waveform with which the user is provided. Therefore, a high degree of adaptation is possible, which results in an improved coexistence ability of the whole system due to the utilization of the appropriate waveforms where needed, a better service for every user due to improved spectral transmissions, an increase in the system capacity due to improved spectral transmissions, a scalable QoS distribution for every user controllable by the operator and depending on the status of the user and an economically efficient usage of the resource spectrum and energy.

In a first possible implementation form of the method according to the second aspect, the configuring the subcarriers in the radio frequency band is based on a user-specific priority assigned to each user.

According to a third aspect, the invention relates to an apparatus for prioritizing user traffic, comprising: a transceiver for multi-carrier transmission within a frequency band, the transceiver being adapted to receive service quality requests of a plurality of users requesting service; and a bandwidth controller being adapted to allocate subcarriers of the multi-carrier transmission to the users and to configure the subcarriers in the frequency band according to the service quality requests of the users, wherein the configuring the subcarriers is based on a user-specific priority assigned to each user.

The apparatus is able to consider all user requests together with the user prioritization and to provide an optimal system configuration that satisfies all user demands at minimum cost in terms of used system resources.

According to a fourth aspect, the invention relates to a method for prioritizing user traffic of a multi-carrier transmission within a frequency band, the method comprising: receiving service quality requests of a plurality of users requesting service; allocating subcarriers of the multi-carrier transmission to the users; and configuring the subcarriers in the frequency band according to the service quality requests of the users, the configuring being based on a user-specific priority assigned to each user.

The method is able to consider all user requests together with the user prioritization and to provide an optimal system configuration that satisfies all user demands at minimum cost in terms of used system resources.

According to a fifth aspect, the invention relates to a method for base stations to control the utilization of different waveforms in a same band to achieve better coexistence properties by adaptive pulse shaping for the user at the spectrum edge or in spectral proximity, to avoid causing interference to other users, higher data rate for users experiencing a good channel and/or high SNR and a more robust transmission.

The method reduces interference to other users, provides high data rates and a robust transmission.

According to a sixth aspect, the invention relates to a method for base stations, the method comprising: prioritizing certain users based on their status, their environmental conditions and their QoS requirement within a cell with the help of adaptive waveforms; and assigning an available bandwidth to users based on their priority status and their channel conditions to achieve a stable QoS for prioritized users while regarding their environmental and system conditions.

The method is able to achieve a stable QoS to priority users no matter where the user is located in the radio cell.

The methods, systems and devices described herein may be implemented as software in a Digital Signal Processor, in a micro-controller or in any other side-processor or as hardware circuit within an application specific integrated circuit.

The invention can be implemented in digital electronic circuitry, or in computer hardware, firmware, software, or in combinations thereof, e.g. in available hardware of conventional mobile devices or in new hardware dedicated for processing the methods and devices described herein.

These and other aspects of the invention will be apparent from the implementation forms described below.

BRIEF DESCRIPTION OF THE DRAWINGS

Further embodiments of the invention will be described with respect to the following figures, in which.

DETAILED DESCRIPTION

Figure 1:
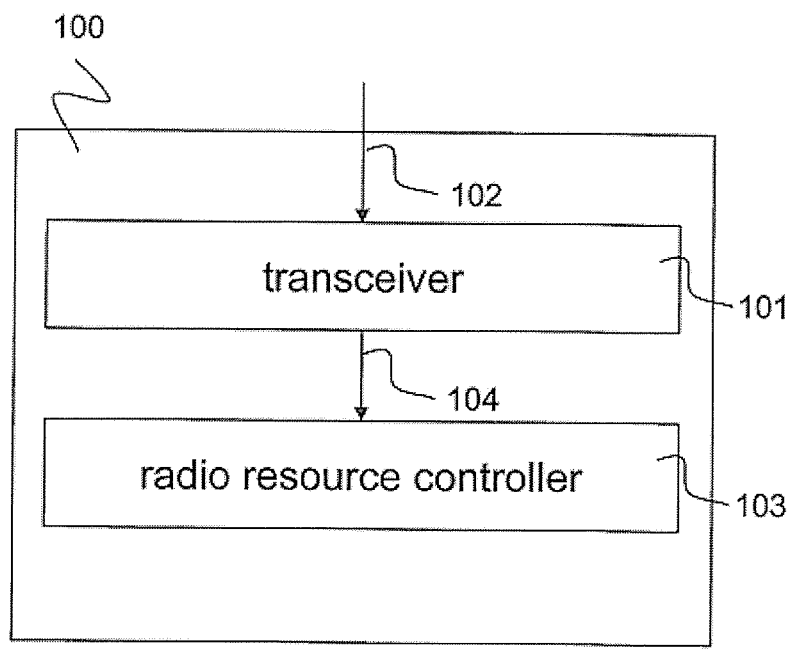
FIG. 1 shows a block diagram of abase station 100 according to an implementation form.

FIG. 1 shows a block diagram of a base station 100 according to an implementation form.

The base station 100 comprises a transceiver 101 and a radio resource controller 103. The transceiver is used for multi-carrier radio transmission within a radio frequency band. The transceiver 101 receives service quality requests 102 of a plurality of users requesting service from the base station 100. The radio resource controller 103 allocates subcarriers of the multi-carrier radio transmission to the users and configures the subcarriers in the radio frequency band according to the service quality requests 102 of the users. The transceiver 101 forwards 104 the service quality requests 102 to the radio resource controller 103.

In an implementation form of the base station 100, the radio resource controller 103 reconfigures the subcarriers in the radio frequency band responsive to a service quality request of a user requesting a different service quality, i.e. a service quality different from the service quality requested by the last request. In an implementation form of the base station 100, the configuring the subcarriers comprises at least one of the following: pulse forming the subcarriers, spacing the subcarriers in the frequency band, selecting a CP, selecting a guard band between two subcarriers allocated to neighboring users, selecting a guard band width between two subcarriers allocated to neighboring users, selecting a transmission mode for each user. In an implementation form of the base station 100, the radio resource controller 103 configures the subcarriers according to at least one of the following: an OQAM-OFDM transmission scheme, a CP-OFDM transmission scheme, a Zero Padding OFDM transmission scheme, an FTN transmission scheme, a priority of the users. In an implementation form of the base station 100, the users are assigned to user groups. In an implementation form of the base station 100, the transceiver 101 performs transmission and reception according to a filter-bank based multi-carrier radio transmission. In an implementation form of the base station 100, the service quality request of a user comprises information on at least one of the following: an SNR of the user, a mobility of the user, a synchronization capability of the user, a battery status of the user, a bandwidth requirement of the user.

In an implementation form of the base station 100, the radio resource controller 103 configures a subcarrier according to an FTN mode when the subcarrier is allocated to a user whose link SNR is larger than a predetermined threshold and whose transceiver supports FTN mode. In an implementation form of the base station 100, the radio resource controller 103 configures a subcarrier according to an FBMC mode when the subcarrier is allocated from edges of the radio frequency band to a user whose transceiver supports FBMC mode. In an implementation form of the base station 100, the radio resource controller 103 configures a subcarrier according to a CP-OFDM mode when the subcarrier is allocated to a user whose transceiver neither supports FBMC mode nor FTN mode. In an implementation form of the base station 100, the radio resource controller 103 configures a subcarrier according to a CP-OFDM mode when the subcarrier is allocated to a user underlying an energy constraint. In an implementation form of the base station 100, the radio resource controller 103 configures a subcarrier according to an FBMC mode when the subcarrier is allocated to a user whose moving speed is higher than a predetermined threshold or whose synchronization capabilities are below a predetermined level and whose transceiver supports FBMC mode. In an implementation form of the base station 100, the configuring the subcarriers in the radio frequency band is based on a user-specific priority assigned to each user.

Figure 2:
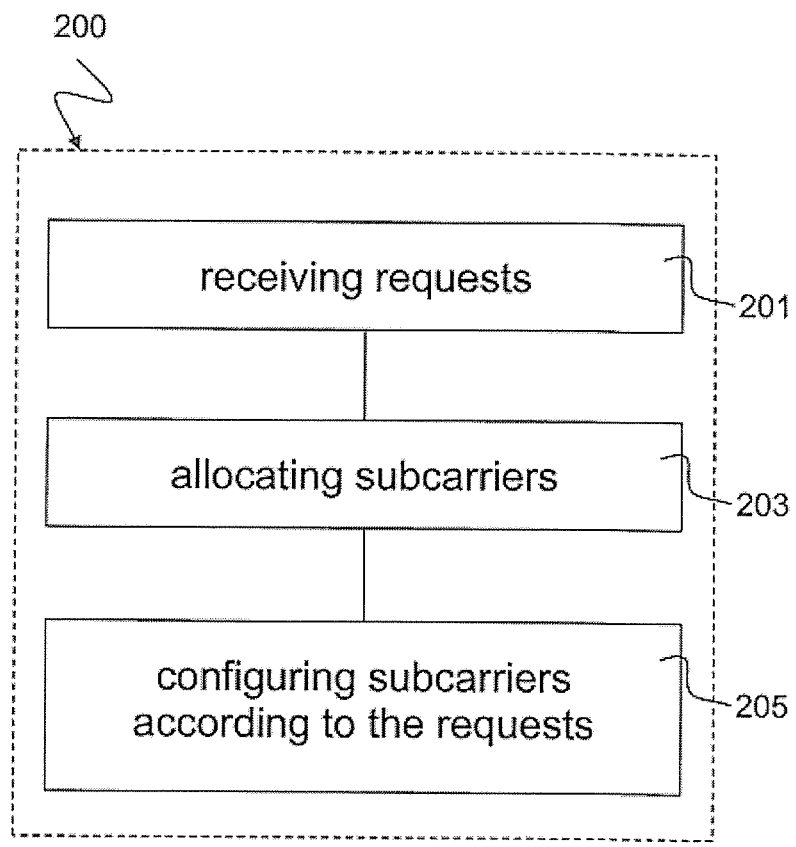
FIG. 2 shows a schematic diagram of a method 200 for controlling radio resources allocation in base station according to an implementation form.

FIG. 2 shows a schematic diagram of a method 200 for controlling radio resources allocation in a base station with a transceiver for multi-carrier radio transmission within a radio frequency band according to an implementation form. The method 200 comprises receiving 201 service quality requests of a plurality of users requesting service from the base station. The method 200 comprises allocating 203 subcarriers of the multi-carrier radio transmission to the users. The method 200 comprises configuring 205 the subcarriers in the radio frequency band according to the service quality requests of the users.

In an implementation form, the method 200 provides an adaptive transmission scheme to allocate the waveform and the transmission mode according to each link/user/usergroup's channel, traffic and terminal type conditions and its corresponding transceiver structure. The users request from a cellular system, e.g. a base station, a service meeting a specific QoS criteria. Additionally, information on its current signal link and system conditions are provided. In an implementation form, the information comprises one or more of the following items: a delay spread of the channel, a Doppler spread of the channel, a noise figure of the channel and/or the receiver, constraints on power consumption, e.g., battery status, user terminal class, providing information on its capability, e.g., bandwidth, maximal modulation order, support FTN mode or not, support FBMC mode or not, support CP-OFDM mode or not. By taking into account all user requests and their reported requirements, the base station selects an optimal system configuration that aims to satisfy all user demands at minimum cost in terms of used system resources. In an implementation form, the method 200 comprises partitioning the users into groups with similar requirements or conditions. In an implementation form, the method 200 comprises selecting the appropriate configuration of transmission scheme for each user group and configuring that configuration for the bandwidth required. In an implementation form of the method 200, the configuring the subcarriers in the radio frequency band is based on a user-specific priority assigned to each user.

Due to the property of spectral shaping for FBMC signaling with low out of band radiation, different configurations of the transmission scheme can coexist in the same frequency band without the need of large or even any guard-bands. In an implementation form of the method 200, the additional parameters considered for the adaptive transmission are one or more of the following: Used pulse shapes and their level of orthogonality, use of FTN (yes/no) and level of orthogonality, subcarrier spacing, complexity (affecting the demand on processing power) and length of CP in case of CP-OFDM mode.

Thus, the method 200 provides an adaptive transmission scheme that dynamically adjusts the transceiver configuration including FBMC modes, pulse shapes, FTN modes, etc. for each user individually during the transmission process, according to the conditions listed above.

Figure 3:
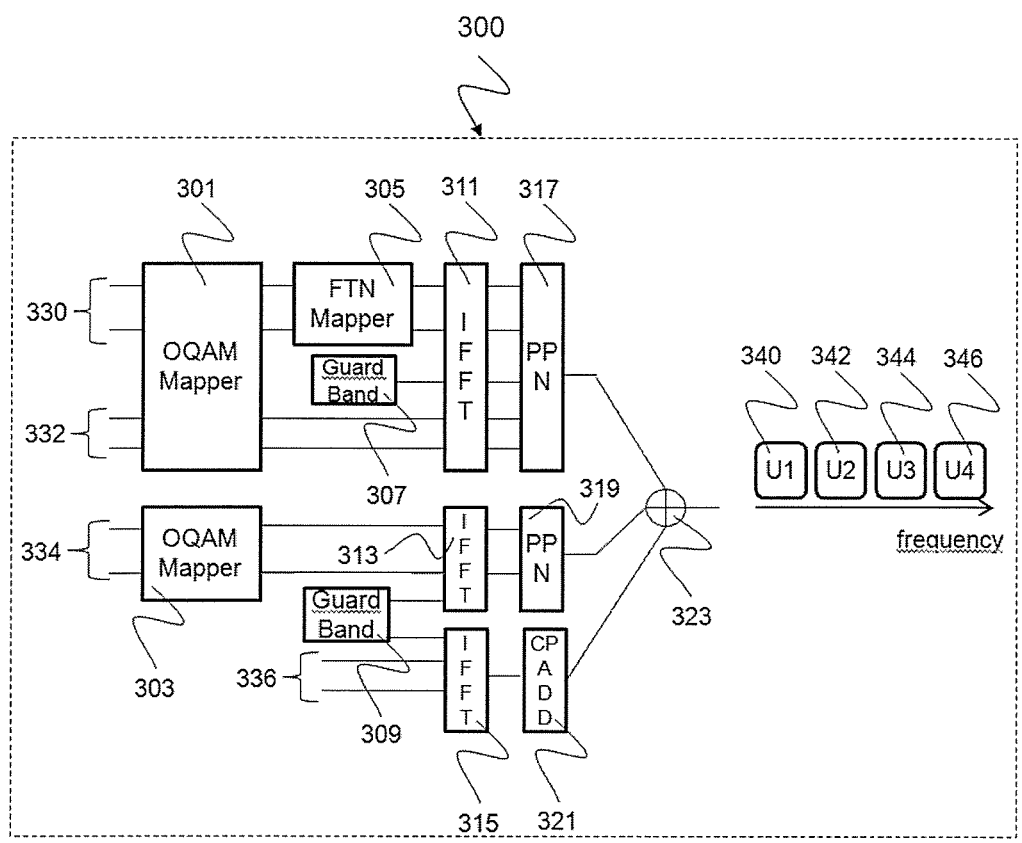
FIG. 3 shows a schematic diagram of a method 300 for radio resources allocation to different users according to an implementation form.

FIG. 3 shows a schematic diagram of a method 300 for radio resources allocation to different symbol users according to an implementation form. FIG. 3 illustrates the configuration at the base station to serve four different users which are user 1 (U1, 340), user 2 (U2, 342), user 3 (U3, 344) and user 4 (U4, 346) on individually configured links 330, 332, 334, 336 for data transmission.

The symbols of User 1 are input to an OQAM mapper 301 performing an OQAM to provide OQAM mapped symbols of User 1 at an output of the OQAM mapper 301. The OQAM mapped symbols of User 1 pass an FTN mapper 305 providing FTN mapped symbols for User 1.

The symbols of User 2 are input to the OQAM mapper 301 performing an OQAM to provide OQAM mapped symbols of User 2 at an output of the OQAM mapper 301. The FTM mapped symbols for User 1 and the OQAM mapped symbols of User 2 are input to an Inverse Fast Fourier Transformation (IFFT) block 311, wherein neighboring symbols of User 1 and User 2 are separated by a guard band 307. The symbols processed by the IFFT 311 are filtered by a PPN processing unit 317 providing subcarriers for User 1 and User 2.

The symbols of User 3 are input to an OQAM mapper 303 performing an OQAM to provide OQAM mapped symbols of User 3 at an output of the OQAM mapper 303. The OQAM mapped symbols of User 3 are input to an IFFT block 313. The symbols processed by the IFFT block 313 are filtered by a Poly-phase Network (PPN) processing unit 319 providing subcarriers for User 3.

The symbols of User 4 are input to an IFFT block 315. The symbols processed by the IFFT block are filtered by a CP Addition (ADD) processing unit 321 providing subcarriers for User 4.

An adder 323 adds the subcarriers for User 1 and User 2, the subcarriers for User 3 and the subcarriers for User 4 providing symbols for User 1, User 2, User 3 and User 4 in frequency domain.

The symbols of User 1 experience a good channel, a Low Doppler spread and an IOTA pulse shape. Therefore, high data rate with FTN is provided, small subcarrier spacing is used and low out-of-band radiation is required.

The symbols of User 2 experience a bad channel with low Doppler spread. Therefore, no FTN is possible.

The symbols of User 3 experience a bad channel, a High Doppler spread and an EGF pulse shape. Therefore, no FTN is possible, large subcarrier spacing is used and the pulse shape is adapted to the channel.

The symbols of User 4 experience a bad channel, a high Doppler spread and power constraints at the receiver. Therefore, no FTN is possible, large subcarrier spacing is used and CP-OFDM is applied for providing a simple equalization.

In an implementation form, the subcarrier spacing per link is not a constant, instead the spacing is individually selected per user.

The method 300 can be applied in a base station 100 as described above with respect to FIG. 1 with a transceiver 101 and a radio resource controller 103 implementing a corresponding resource allocation algorithm.

The transceiver 101 of FIG. 1 receives the service quality requests of User 1 (U1, 340), user 2 (U2, 342), User 3 (U3, 344) and User 4 (U4, 346) and forwards these service quality requests to the radio resource controller 103 that individually configures the links 330, 332, 334, 336 for data transmission. The OQAM mappers 301, 303, the FTN mapper 305, the guard bands 307, 309, the IFFT blocks 311, 313, 315, the PPN processing units 317, 319 and the CP ADD processing unit 321 are arranged in the transceiver 101. The assigning of the link 330 for User 1, link 332 for User 2, link 334 for User 3 and link 336 for User 4 to the different processing units 301, 303, 305, 307, 309, 311, 313, 315, 317, 319, 321 of the transceiver 101 and the allocation and configuration of those processing units in the transceiver 101 are controlled by the radio resource controller 103.

Figure 4:
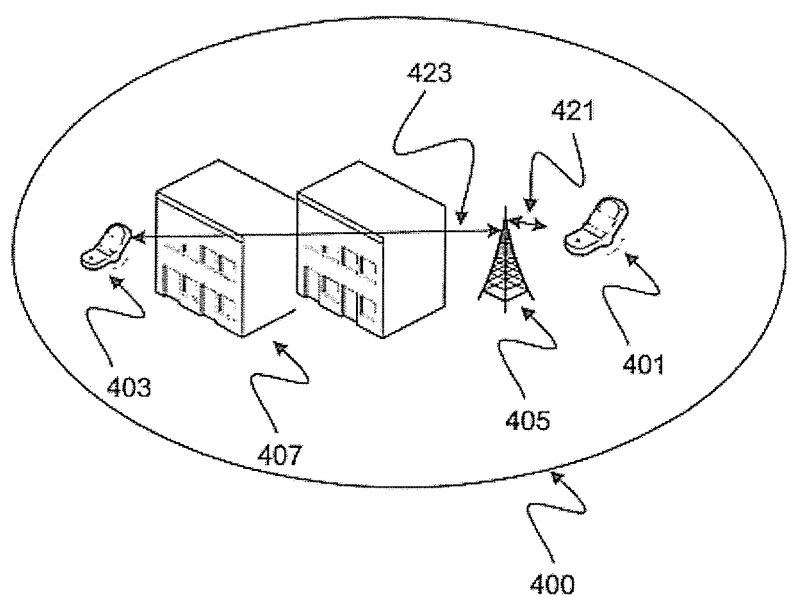
FIG. 4 shows a schematic diagram of a radio resources allocation algorithm for two users 401, 403 within a macro cell 400 according to an implementation form.

FIG. 4 shows a schematic diagram of a radio resources allocation algorithm for two users 401, 403 within a macro cell 400 according to an implementation form. As can be seen in FIG. 4, there are two users 401, 403 in a scenario of an LTE macro cell 400, where User #1 401 is located near the base station 405 and experiencing good channel properties, meanwhile User #2 403 is located at the cell edge with bad channel conditions. The communication channel, i.e. the air interface 421 of User #1 401 is directly connected to the base station 405 while the communication channel, i.e. the air interface 423 of User #2 403, has to pass through two buildings 407 located between User #2 403 and the base station 405 before reaching the base station 405. The base station 405 may correspond to a base station 100 as described with respect to FIG. 1, comprising a transceiver 101 and a radio resource controller 103. User #1 401 and User #2 403 have the same data rate demands. User #1 401 has no complexity issues with respect to power consumption and less bandwidth occupied than User #2 403. User #2 403 has low complexity with respect to power consumption and more bandwidth occupied than User #1 401. The radio resources allocation, e.g. performed by the radio resource controller 103 as described above with respect to FIG. 1, provides User #1 401 with a very high data rate service by consuming only a small portion of the available bandwidth thanks to using the FTN mode transmission. Given that User #2 403 has the same data rate demand and its allowed receiver power consumption is rather limited, i.e. low on battery, the system configures User #2 403 in the CP-OFDM mode and assigns relatively more bandwidth than User #1 401, since conventional CP-OFDM has a lower spectrum efficiency but lower receiver complexity/power-consumption demand than FTN mode based on FBMC.

In an implementation form of the resource allocation algorithm for those users whose link SNR is larger than a pre-defined threshold ("SNR_TH_1"), and whose transceiver supports FTN mode, the resource allocation algorithm allocates FTN mode resource to them.

In an implementation form of the resource allocation algorithm for those systems whose spectral masks are stringent and whose users happened to be edge-band located and whose transceiver supports FBMC mode, the resource allocation algorithm allocates FBMC mode resource to them.

In an implementation form of the resource allocation algorithm for those users whose transceiver neither supports FTN nor FBMC mode, the resource allocation algorithm allocates CP-OFDM mode resource to them (downward compatibility). The resource allocation algorithm selects CP-OFDM mode if the user underlies strict energy constraints, i.e. low on battery. Since CP-OFDM is much less complex, the processing is much less power consuming.

In an implementation form of the resource allocation algorithm for systems with high mobility, i.e., the estimated moving speed is higher than a pre-defined threshold "SPEED_TH_1" or with poor synchronization capabilities, the resource allocation algorithm allocates FBMC mode resources with larger subcarrier spacing and optimized pulse shape.

In an implementation form of the resource allocation algorithm, upon all users' bandwidth requirement, the resource allocation algorithm decides on the partition of bandwidth resources for each transmission mode, i.e., FTN, FTN+FBMC, FBMC, CP-OFDM, etc. and the guard-band width between two neighboring configurations if necessary.

In an implementation form of the resource allocation algorithm, the resource allocation algorithm signals the allocation decisions via downlink signaling channel to each user, e.g., via PDCCH for LTE.

The resource allocation algorithm can be applied in a radio resource controller 103 of a base station 100 as described above with respect to FIG. 1. The steps allocating subcarriers 203 and configuring subcarriers 205 of the method 200 described with respect to FIG. 2 can apply the resource allocation algorithm for the allocation and configuration of the subcarriers.

Figure 5:
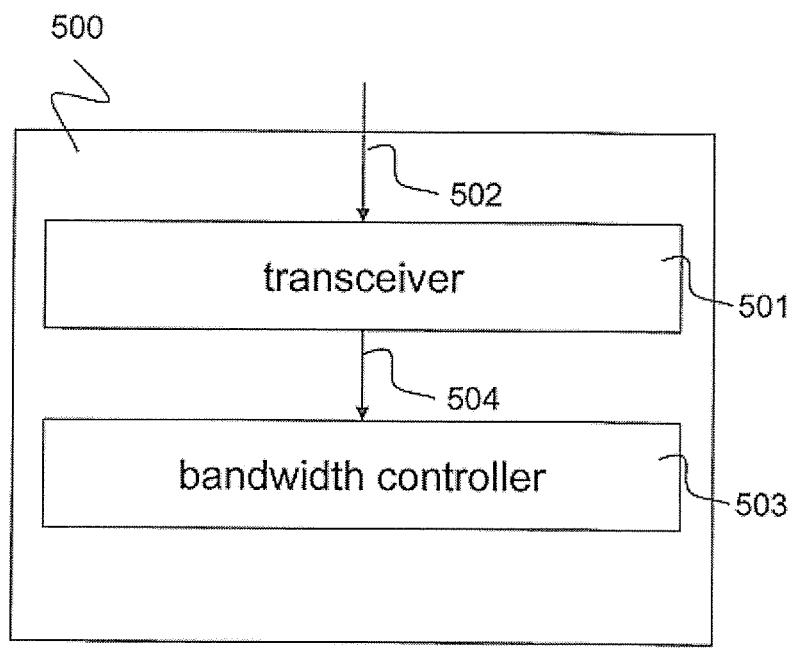
FIG. 5 shows a block diagram of an apparatus 500 for prioritizing user traffic according to an implementation form.

FIG. 5 shows a block diagram of an apparatus 500 for prioritizing user traffic according to an implementation form.

The apparatus 500 is used for prioritizing user traffic. The apparatus 500 comprises a transceiver 501 and a bandwidth controller 503. The transceiver 501 is used for multi-carrier transmission within a frequency band. The transceiver 501 receives service quality requests 502 of a plurality of users requesting service. The bandwidth controller 503 allocates subcarriers of the multi-carrier transmission to the users and configures the subcarriers in the frequency band according to the service quality requests 502 of the users. The step of configuring the subcarriers is based on a user-specific priority assigned to each user.

The transceiver 501 may correspond to the transceiver 101 described with respect to FIG. 1. The bandwidth controller 503 may correspond to the radio resource controller 103 described with respect to FIG. 1. In an implementation form, the transceiver 501 is used for multi-carrier transmission with respect to wire line data transmission, e.g. DSL.

Figure 6:
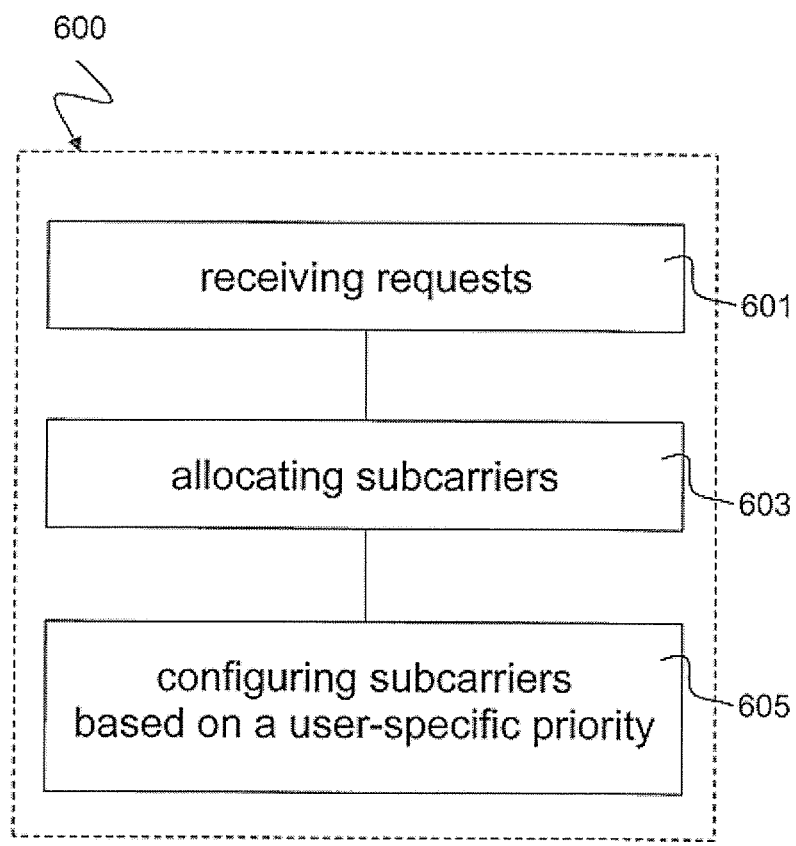
FIG. 6 shows a schematic diagram of a method 600 for prioritizing user traffic according to an implementation form.

FIG. 6 shows a schematic diagram of a method 600 for prioritizing user traffic according to an implementation form.

The method is used for prioritizing user traffic of a multi-carrier transmission within a frequency band. The method 600 comprises receiving 601 service quality requests of a plurality of users requesting service. The method 600 comprises allocating 603 subcarriers of the multi-carrier transmission to the users. The method 600 comprises configuring 605 the subcarriers in the frequency band according to the service quality requests of the users, the configuring being based on a user-specific priority assigned to each user.

The step of receiving requests 601 may correspond to the step of receiving requests 201 described with respect to FIG.

2. The step of allocating subcarriers 603 may correspond to the step of allocating subcarriers 203 described with respect to FIG. 2. The step of configuring subcarriers based on a user-specific priority 605 may correspond to the step of configuring subcarriers 205 described with respect to FIG. 2 when the configuration of the subcarriers is based on a priority of the users.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the invention beyond those described herein. While the present inventions have been described with reference to one or more particular embodiments, those skilled in the art recognize that many changes may be made thereto without departing from the scope of the present invention. It is therefore to be understood that within the scope of the appended claims and their equivalents, the inventions may be practiced otherwise than as specifically described herein.

What is claimed is:

1. A base station, comprising:
a transceiver capable of performing multi-carrier radio transmission within a radio frequency band, wherein the transceiver is configured to receive a service quality request from each of a plurality of user equipment devices requesting a service quality from the base station; and
a radio resource controller, configured to dynamically allocate a subcarrier of the multi-carrier radio transmission to each of the user equipment devices and dynamically configure a pulse shape of the subcarrier in response to the service quality request of the user equipment device;
wherein the service quality request of a user equipment device comprises information of at least one of the following:
a signal-to-noise ratio (SNR) of the user equipment device;
a mobility of the user equipment device;
a synchronization capability of the user equipment device;
a battery status of the user equipment device; and
a bandwidth requirement of the user equipment device.

2. The base station of claim 1, wherein the radio resource controller reconfigures the pulse shape of the subcarrier in response to a further service quality request of the user equipment device requesting a different service quality.

3. The base station of claim 1, wherein the radio resource controller dynamically allocates a subcarrier to each of the user equipment devices in at least one of the following ways:
pulse forming subcarriers to be allocated to the user equipment devices;
spacing the subcarriers in the frequency band;
selecting a cyclic prefix (CP) for each subcarrier;
selecting a guard band between two subcarriers allocated to two neighboring user equipment devices;
selecting a guard band width between two subcarriers allocated to two neighboring user equipment devices; and
selecting a transmission mode for the user equipment device.

4. The base station of claim 1, wherein the radio resource controller dynamically configures the pulse shape of the subcarrier according to at least one of the following:
an Offset Quadrature Amplitude Modulation-Orthogonal Frequency Division Multiplexing (OQAM-OFDM) transmission scheme;
a Cyclic Prefix-OFDM (CP-OFDM) transmission scheme;
a Zero Padding OFDM transmission scheme;
a Faster-Than-Nyquist (FTN) transmission scheme; and
a priority of the user equipment device.

5. The base station of claim 1, wherein user equipment devices requesting a same service quality are grouped in a same user equipment group.

6. The base station of claim 1, wherein the transceiver is configured for at least one of a filter-bank based multi-carrier radio transmission and a Faster-Than-Nyquist (FTN) transmission.

7. The base station of claim 1, wherein the radio resource controller dynamically configures a subcarrier according to a Faster-Than-Nyquist (FTN) mode when the subcarrier is allocated to a user equipment device whose transceiver supports the FTN mode.

8. The base station of claim 1, wherein the radio resource controller dynamically configures a subcarrier according to a Filter Bank based Multi Carrier (FBMC) mode when the subcarrier is allocated to a user equipment device whose transceiver supports the FBMC mode.

9. The base station of claim 1, wherein the radio resource controller dynamically configures the pulse shape of the subcarrier according to a Cyclic Prefix-OFDM (CP-OFDM) mode when the subcarrier is allocated to a user equipment device whose transceiver supports neither a Filter Bank based Multi Carrier (FBMC) mode nor a Faster-Than-Nyquist (FTN) mode.

10. The base station of claim 1, wherein the radio resource controller dynamically configures the pulse shape of the subcarrier according to a Cyclic Prefix-OFDM (CP-OFDM) mode when the subcarrier is allocated to a user equipment device underlying an energy constraint.

11. The base station of claim 1, wherein the radio resource controller dynamically configures the pulse shape of the subcarrier according to a Filter Bank based Multi Carrier (FBMC) mode when the subcarrier is allocated to a user equipment device whose moving speed is higher than a predetermined threshold or whose synchronization capabilities are below a predetermined level and whose transceiver supports the FBMC mode.

12. A method for controlling radio resource allocation by a base station, wherein the base station is capable of performing multi-carrier radio transmission within a radio frequency band, the method comprising:
receiving, by the base station, a service quality request from each of a plurality of user equipment devices requesting a service quality;
dynamically allocating, by the base station, a subcarrier of the multi-carrier radio transmission to each of the user equipment devices; and
dynamically configuring, by the base station, a pulse shape of the subcarrier in response to the service quality request of the user equipment device;
wherein the service quality request of a user equipment device comprises information of at least one of the following:

a signal-to-noise ratio (SNR) of the user equipment device;

a mobility of the user equipment device;

a synchronization capability of the user equipment device;

a battery status of the user equipment device; and a bandwidth requirement of the user equipment device.

13. An apparatus for prioritizing user equipment traffic, comprising:

a transceiver capable of performing multi-carrier transmission within a frequency band, the transceiver being configured to receive a service quality request from each of a plurality of user equipment devices requesting a service quality; and a bandwidth controller being configured to dynamically allocate a subcarrier of the multi-carrier transmission to each of the user equipment devices and dynamically configure a pulse shape of the subcarrier in response to the service quality request of the user equipment device based on a user-specific priority assigned to each user equipment device;

wherein the service quality request of a user equipment device comprises information of at least one of the following:

a signal-to-noise ratio (SNR) of the user equipment device;

a mobility of the user equipment device;

a synchronization capability of the user equipment device;

a battery status of the user equipment device; and a bandwidth requirement of the user equipment device.

14. The method of claim 12, wherein the base station dynamically configures the pulse shape of the subcarrier in response to the service quality request of the user equipment device based on a user-specific priority assigned to each user equipment device.

15. The method of claim 12, further comprising:

reconfiguring, by the base station, the pulse shape of the subcarrier in response to a further service quality request of the user equipment device requesting a different service quality.

16. The method of claim 12, wherein dynamically allocating a subcarrier to each of the user equipment devices comprises at least one of the following:

pulse forming subcarriers to be allocated to the user equipment devices;

spacing the subcarriers in the frequency band;

selecting a cyclic prefix (CP) for each subcarrier;

selecting a guard band between two subcarriers allocated to two neighboring user equipment devices;

selecting a guard band width between two subcarriers allocated to two neighboring user equipment devices; and selecting a transmission mode for the user equipment device.

* * * * *